Jan. 5, 1954  J. W. WIESMANN  2,665,147
WIRE DISTRIBUTING FLOOR STRUCTURE
Filed June 23, 1948  2 Sheets-Sheet 1

INVENTOR.
JOSEPH W. WIESMANN
BY
J. Stanley Churchill
ATTORNEY.

Jan. 5, 1954  J. W. WIESMANN  2,665,147
WIRE DISTRIBUTING FLOOR STRUCTURE
Filed June 23, 1948  2 Sheets-Sheet 2
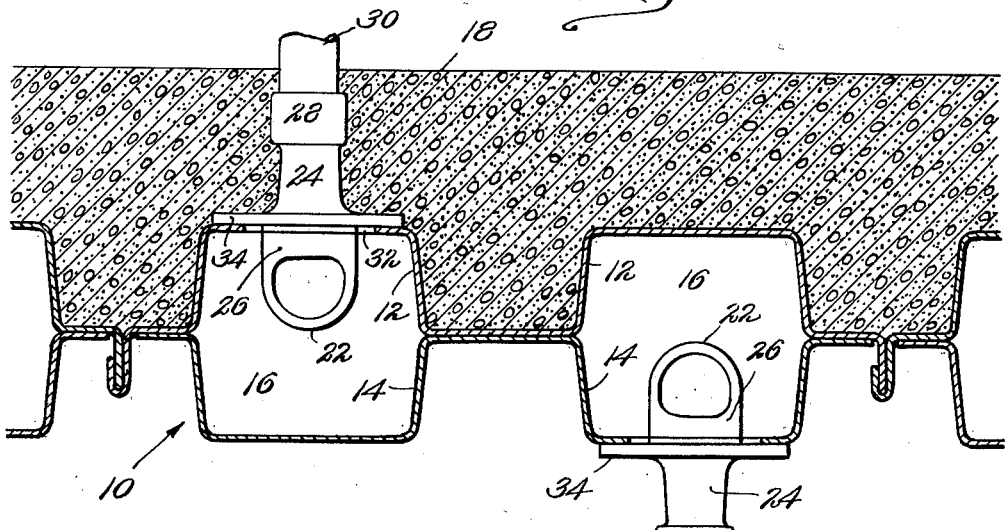
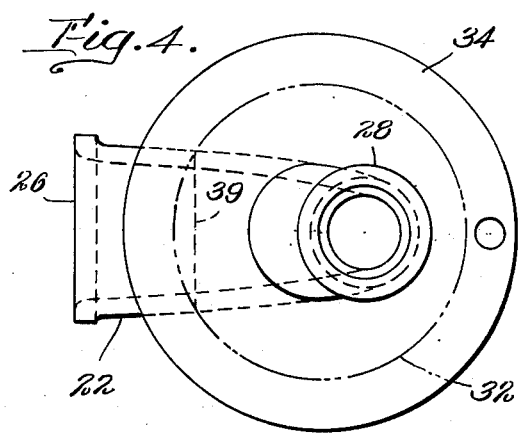
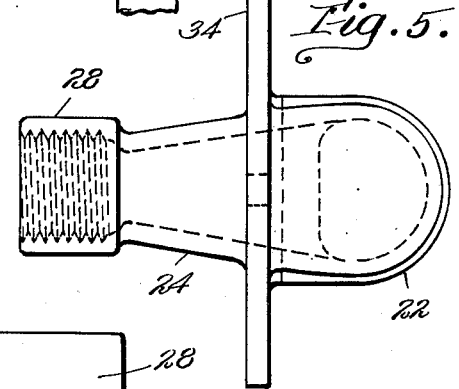
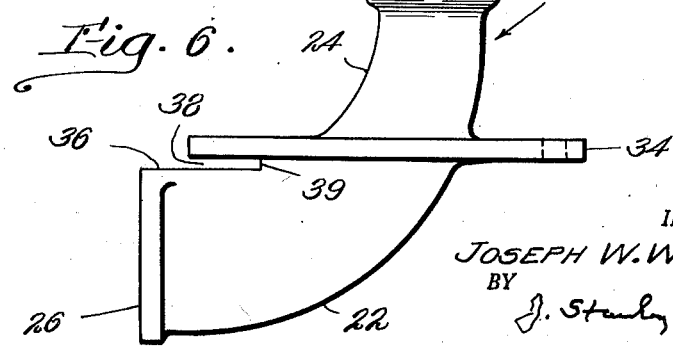
INVENTOR.
JOSEPH W. WIESMANN
BY
J. Stanley Churchill
ATTORNEY.

Patented Jan. 5, 1954

2,665,147

UNITED STATES PATENT OFFICE

2,665,147

WIRE DISTRIBUTING FLOOR STRUCTURE

Joseph William Wiesmann, Pittsburgh, Pa., assignor to H. H. Robertson Company, Pittsburgh, Pa., a corporation of Pennsylvania Application June 23, 1948, Serial No. 34,807

1 Claim. (Cl. 285—102)

This invention relates to a wire distributing floor structure and more particularly to a conduit fitting for a wire distributing floor.

The invention has for an object to provide a novel and improved conduit fitting, for use in leading wires into or from the cells of a wire distributing floor and which is characterized by its novel and simple construction by which installation of the fitting in a wire distributing floor cell is facilitated.

With this object in view and such others as may hereinafter appear, the invention consists in the conduit fitting for a wire distributing floor and in the various structures, arrangements and combinations of parts hereinafter described and particularly defined in the claims at the end of this specification.

Figure 1:
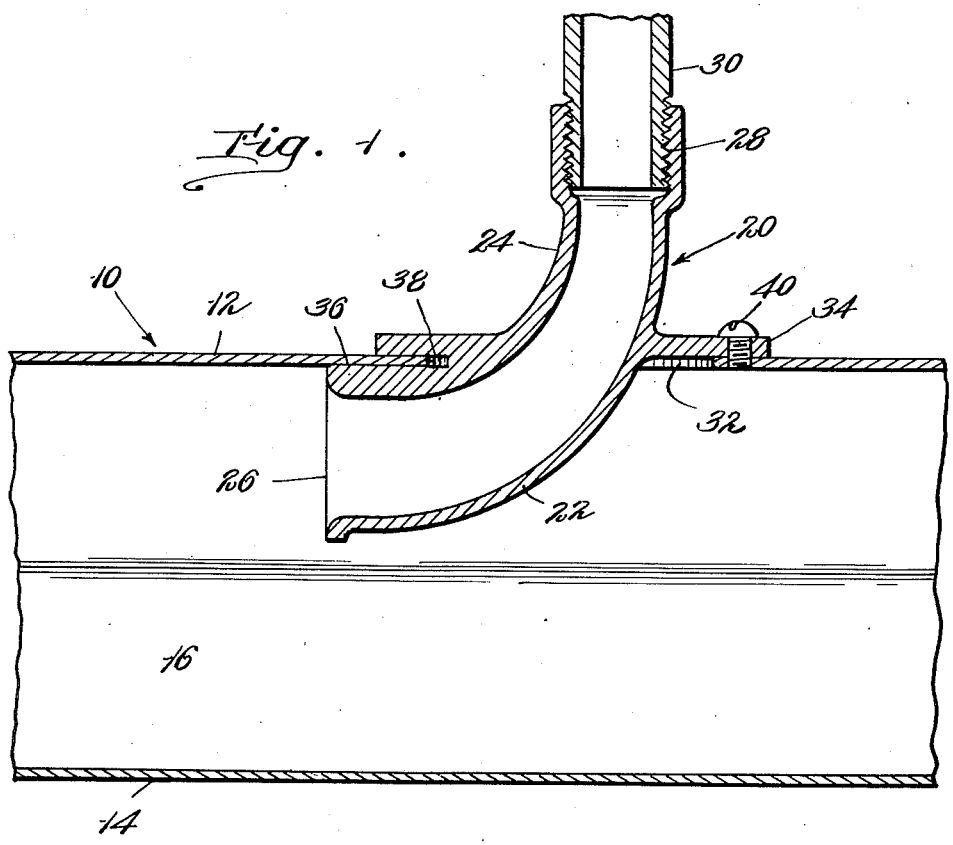
Figure 2:
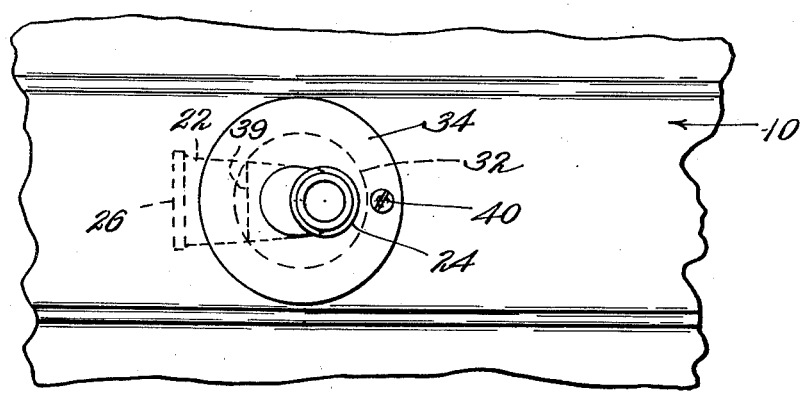

In the drawings illustrating the preferred embodiment of the invention, Fig. 1 is a cross sectional view of a wire distributing flooring member embodying the present invention; Fig. 2 is a plan view of the same shown upon a reduced scale; Fig. 3 is a transverse sectional view through a portion of the wire distributing floor showing the present fitting assembled in operative position; and Figs. 4, 5 and 6 are detail views comprising plan, end, and side elevations respectively of the present fitting.

In general, the present invention contemplates an improved conduit fitting for use in a wire distributing flooring system embodying a multicellular metal flooring having a plurality of spaced cells or ducts through which the wires may be drawn to provide electrical service to different parts of the building. The fitting is preferably connected to one wall of a cell, having a portion extended through an opening therein and a portion extended outwardly from the cell and at right angles thereto having provision for connection to a conduit pipe through which the wires may be fed into or out of the wire distributing duct. In its preferred form, the fitting is provided with a flanged portion for securing the fitting to the cell wall. Preferably the fitting is arranged to cooperate with the edges of the cell opening in a manner such as to prevent displacement thereof and so that but one anchoring screw or other fastening element is required to secure the fitting to the cell wall, thus facilitating assembly of the fitting with the cell and minimizing the cost of installation.

In practice, the fitting may be attached to the upper wall of a cellular duct for connection to a conduit pipe leading to a supply box, control panel or other electrical device, or, the fitting may be connected to the bottom wall of a cell for supplying service to ceiling outlets, lamps or other fixtures.

Referring now to the drawings, the invention is herein illustrated as embodied in a wire distributing flooring system such as is disclosed in the United States Patents Nos. 1,855,082 and 2,125,366. Such systems embody a multicellular metal flooring through which the wires may be drawn to provide electrical service to different parts of the building. As herein shown, 10 represents one type of such cellular metal flooring comprising an upper corrugated sheet 12 and a lower corrugated sheet 14 welded together to form a series of spaced parallel hollow beams or cells 16 upon the top of which a concrete fill 18 may be laid to complete the floor.

As herein illustrated, the improved fitting comprises a hollow curved member 20 of substantially L-shape having one leg 22 arranged to extend within and lengthwise of the cell, the other leg 24 extending beyond and substantially at right angles to the wall of the cell. The inner leg 22 terminates in a flared and substantially U-shaped portion 26 and is gradually curved and tapered toward the opposite end to terminate in a cylindrical portion of the outer leg 24 which is provided with an interiorly threaded portion 28 adapted to receive a conduit pipe 30. The interior walls of the fitting are preferably smoothed and rounded to facilitate the fishing of wires therethrough. The inner leg 22 of the fitting is arranged to extend through an opening 32 formed in the cell wall and the fitting is provided with a flanged portion 34 intermediate its ends formed integrally therewith and arranged to be secured to the wall of the cell.

In order to provide a structure adapted to be assembled upon the cell wall in a manner such as to prevent vertical displacement of the fitting and to require but one fastening element to securely anchor the fitting to the cell wall, the flanged portion 34, herein shown as circular in shape, is arranged substantially parallel to the horizontal axis of the inner leg 22, a portion of the flange extending over the flat upper surface 36 of the U-shaped leg and spaced therefrom to form a recessed or grooved portion 38 arranged to receive and embrace the edge of the opening 32 in the cell wall when assembled therewith, as shown in Fig. 1. The fitting is then firmly secured to the cell wall by a single fastening element, herein shown as comprising a screw 40, extended through an opening in the flange and screwed into the upper wall of the cell As illustrated in Figs. 2 and 4, the end wall 39 of the groove 33 is preferably formed transversely of the fitting so that when the fitting is installed in a cell the corner edges of the end wall engage the edge of the cell opening at two spaced points as shown, and, the fastening screw 40 is preferably disposed at a point directly opposite the grooved portion. In practice, the size of the opening 32 in the cell wall is preferably related to the size of the fitting so as to permit the leg 22 to be inserted therethrough by tipping the fitting slightly and to thereafter permit the bottom face of the flange to rest flat against the face of the cell wall. The fitting may then be moved forward in a direction to engage the edge of the opening in the groove, the corner edges of the groove bearing against the edges of the opening at spaced points at which time the threaded opening in the cell wall is in alignment with the opening in the flange so that the screw 40 may be then inserted. It will be observed that when in assembled position, the outside of the circular flange 34 is substantially concentric with the round opening 32 in the cell wall.

The present fitting may be secured in any wall of a wiring duct, being herein shown as secured to an upper wall and a lower wall, and in practice, the size of that portion of the fitting extended within the cell relative to the internal cross-sectional area of the cell is preferably such as to provide ample clearance within the cell to permit other wires to be fished therepast.

From the above description of the preferred embodiment of the invention, it will be observed that the present novel structure of fitting for a wire distributing floor is such as to facilitate installation of the fitting and to permit the fitting to be firmly secured in the cell by means of a single anchoring screw thus effecting an economy in the time and labor involved in an installation of a wiring system. It will be further observed that when the fitting is inserted in assembled relation in an opening provided therefor the engagement of the grooved portion with the edge of the opening prevents vertical displacement of the fitting and renders the fitting self supporting in the cell wall so that the fitting will remain in assembled relation without other support while the workman is preparing to insert the anchoring screw. This feature is of particular advantage when installing ceiling outlet fittings in the underside of a floor cell in the field and substantially reduces the amount of difficult overhead work formerly required when installing prior fittings of this type.

While the preferred embodiment of the invention has been herein illustrated and described it will be understood that the invention may be embodied in other forms within the scope of the following claim.

Having thus described the invention, what is claimed is:

In a wire distributing floor, an elongated duct having a substantially flat wall and an opening through said wall, a hollow fitting mounted in said opening and having a leg extending longitudinally within said duct, said leg terminating in a flared mouth of substantially less sectional area than the interior of said duct and of less sectional area than said opening, said fitting having a curved hollow portion constituting an extension of said leg and extending outwardly through said opening and of less transverse dimension than said opening, a portion of the outer surface of said leg being substantially flat and bearing against the inner surface of said flat wall for a substantial distance radially outwardly from said opening, an integral flange around said curved hollow portion extending outwardly in all directions beyond the periphery of said opening and having a substantially flat surface bearing against the outside of said wall around said opening, that portion of said flange opposite the flat portion of said leg extending beyond the edge of said opening a distance no greater than the distance from the opposite side of said curved portion to the edge of said opening and defining a groove with said flat surface of said leg, said groove having an end wall on said curved portion engaging the peripheral edge of said opening at at least two spaced points, and a single threaded fastener holding said flange to said duct wall at a point substantially diametrically across said opening from said shoulder.

JOSEPH WILLIAM WIESMANN.

References Cited in the file of this patent

UNITED STATES PATENTS

| Number | Name | Date |
| --- | --- | --- |
| 1,228,330 | Loughridge | May 29, 1917 |
| 1,644,310 | Strongson | Oct. 4, 1927 |
| 1,986,121 | Sargent | Jan. 1, 1935 |
| 2,234,640 | Austin | Mar. 11, 1941 |

FOREIGN PATENTS

| Number | Country | Date |
| --- | --- | --- |
| 279,301 | Great Britain | Oct. 27, 1927 |